United States Patent
Neal

(10) Patent No.: US 11,606,263 B2
(45) Date of Patent: Mar. 14, 2023

(54) LARGE NETWORK SIMULATION

(71) Applicant: Science Applications International Corporation, Reston, VA (US)

(72) Inventor: Todd A. Neal, Madison, AL (US)

(73) Assignee: Science Applications International Corporation, Reston, VA (US)

( * ) Notice: Subject to any disclaimer, the term of this patent is extended or adjusted under 35 U.S.C. 154(b) by 282 days.

(21) Appl. No.: 16/008,422

(22) Filed: Jun. 14, 2018

(65) Prior Publication Data

US 2019/0116092 A1 Apr. 18, 2019

Related U.S. Application Data

(63) Continuation of application No. 16/004,971, filed on Jun. 11, 2018, now abandoned.

(60) Provisional application No. 62/573,311, filed on Oct. 17, 2017.

(51) Int. Cl.
| | | |
|---|---|---|
| *H04L 41/14* | (2022.01) | |
| *H04L 61/3015* | (2022.01) | |
| *H04L 45/7453* | (2022.01) | |
| *H04L 41/0803* | (2022.01) | |
| *H04L 9/40* | (2022.01) | |
| H04L 61/5007 | (2022.01) | |

(52) U.S. Cl.
CPC ........ *H04L 41/145* (2013.01); *H04L 41/0803* (2013.01); *H04L 45/7453* (2013.01); *H04L 61/3015* (2013.01); *H04L 63/1433* (2013.01); H04L 61/5007 (2022.05)

(58) Field of Classification Search
CPC ... H04L 41/145; H04L 43/50; H04L 45/7433; H04L 41/0803; H04L 45/7453; H04L 61/3015; H04L 63/1433; G06F 17/5009
See application file for complete search history.

(56) References Cited

U.S. PATENT DOCUMENTS

| | | |
|---|---|---|
| 6,757,742 B1 * | 6/2004 | Viswanath ........ H04L 29/12018 370/389 |
| 6,820,042 B1 | 11/2004 | Cohen et al. |
| 7,457,737 B2 | 11/2008 | Patiejunas |
| 7,620,535 B2 | 11/2009 | Shevenell et al. |
| 7,633,939 B2 | 12/2009 | Curran-Gray et al. |
| 8,413,216 B2 | 4/2013 | Hughes et al. |
| 8,532,970 B2 | 9/2013 | White et al. |
| 8,751,629 B2 * | 6/2014 | White ................ G09B 19/0053 703/13 |
| 9,246,768 B2 | 1/2016 | White et al. |
| 2002/0016708 A1 | 2/2002 | Houh |

(Continued)

OTHER PUBLICATIONS

Baumgart, I., et al., "OverSim: A Flexible Overlay Network Simulation Framework", Jun. 2007.

(Continued)

*Primary Examiner* — Gregory Todd
(74) *Attorney, Agent, or Firm* — Banner & Witcoff, Ltd.

(57) ABSTRACT

Systems, methods, and apparatuses are described for simulating a network. Interrogations directed to hosts in the simulated network may be received. For some interrogations, data objects may be instantiated to simulate the interrogated hosts by, e.g., providing responses to low-level network commands. One or more characteristics of a simulated host may be determined randomly or pseudo-randomly.

28 Claims, 6 Drawing Sheets

(56) References Cited

U.S. PATENT DOCUMENTS

| | | | |
|---|---|---|---|
| 2004/0054807 A1* | 3/2004 | Harvey | H04L 67/104 709/243 |
| 2009/0154464 A1 | 6/2009 | Kim et al. | |
| 2009/0210526 A1* | 8/2009 | Howell | H04L 29/12811 709/224 |
| 2011/0222407 A1* | 9/2011 | Matsuo | H04L 41/145 370/241 |
| 2012/0029898 A1 | 2/2012 | Carroll et al. | |
| 2012/0059921 A1 | 3/2012 | Serban et al. | |
| 2012/0158395 A1* | 6/2012 | Hughes | G06F 11/3414 703/21 |
| 2014/0081589 A1* | 3/2014 | Lin | G06F 11/3409 702/109 |
| 2014/0115687 A1* | 4/2014 | Roesch | H04L 63/0263 726/13 |
| 2014/0281715 A1* | 9/2014 | Khan | G06F 11/261 714/28 |
| 2014/0343915 A1* | 11/2014 | Song | H04L 41/145 703/13 |
| 2016/0014150 A1* | 1/2016 | Hughes | G06F 15/16 726/23 |
| 2016/0028631 A1* | 1/2016 | Yishay | H04L 45/7453 370/392 |
| 2017/0223037 A1 | 8/2017 | Singh et al. | |
| 2017/0304707 A1* | 10/2017 | Morton | G09B 5/12 |
| 2018/0357422 A1* | 12/2018 | Telang | G06F 21/577 |
| 2019/0058717 A1* | 2/2019 | Chailytko | H04L 63/1425 |

OTHER PUBLICATIONS

Bajaj, L., et al., "GloMoSim: A Scalable Network Simulation Environment", 1999.

Document titled "Cyberoperations Enhanced Network and Training Simulators (Centsò)", downloaded Apr. 5, 2018, from <http://cybercents.com/wp-content/uploads/2017/10/Metova-CyberCENTS-CENTS%C2%AE-Data-Sheet.pdf>.

Aug. 29, 2018—(WO) International Search Report and Written Opinion—App No. PCT/US2018/038945.

* cited by examiner

LARGE NETWORK SIMULATION

CROSS REFERENCE TO RELATED APPLICATION

This application is a continuation of U.S. patent application Ser. No. 16/004,971, titled "Large Network Simulation," and filed Jun. 11, 2018, which claims priority to U.S. provisional patent application No. 62/573,311, titled "Large Network Simulation," and filed Oct. 17, 2017. Application Ser. Nos. 16/004,971 and 62/573,311, in their entirety, are incorporated by reference herein.

BACKGROUND

OSINT, or Open Source Intelligence, generally refers to intelligence that is collected or deduced from publicly available (or "open") sources of information. Open sources of information include, without limitation, social media, web pages, news services, etc. OSINT may be used for a variety of important military and civilian purposes such as terrorism prevention, gathering military intelligence regarding a potential adversary, crime prevention, crime solving, etc.

OSINT gathering and other cyber operations can often be performed by operators using simple computers connected to the Internet and/or other networks. Such operators must be trained, but for a variety of reasons, it may be undesirable to perform that training on the actual Internet or other functioning real-world networks. For example, performing such training on real-world networks could reveal intelligence-gathering techniques or targets.

In theory, activity of real-world large networks such as the Internet can be simulated. The effectiveness of such simulation depends on how well the simulation models a complex, large scale network. If there are a limited number of simulated network threats, targets, or other elements of interest, and if those elements are relatively easy to find, and/or if simulated elements have behaviors that are different from what might be expected in the real world, training may be less valuable. For example, a simulation that only includes a few hosts may not require a trainee to discriminate potential elements of interest from a large number of irrelevant or ambiguous information sources. Such discrimination may be important in many actual cyber operations. As another example, simulated elements of interest may all have local private IP addresses. Hosts with such IP addresses may be easy to identify and/or may not behave as actual hosts on the Internet might behave. As a further example, hosts that are intended to represent actors in foreign nations may be easily identifiable as existing on a local network, as those hosts may have extremely low latency and/or may be detectable (using a traceroute command) as being only a few hops away.

For these and other reasons, effectively simulating large-scale networks has proven to be difficult and costly. Creating and running a large-scale network solely for purposes of training requires a large investment in computing and network resources. For this reason, traditional cyber training has thus involved unrealistic small-scale networks.

SUMMARY

This Summary is provided to introduce a selection of some concepts in a simplified form as a prelude to the Detailed Description. This Summary is not intended to identify key or essential features.

One or more computers may receive interrogations directed to hosts in a simulated network. For some interrogations directed to hosts determined to be background hosts, the simulation computer system may instantiate data objects to simulate the interrogated hosts by, e.g., providing responses to low-level network commands. One or more characteristics of a background host may be determined randomly or pseudo-randomly.

These and other features are described in more detail below.

BRIEF DESCRIPTION OF THE DRAWINGS

Some embodiments are illustrated by way of example, and not by way of limitation, in the figures of the accompanying drawings and in which like reference numerals refer to similar elements.

DETAILED DESCRIPTION

Figure 1:
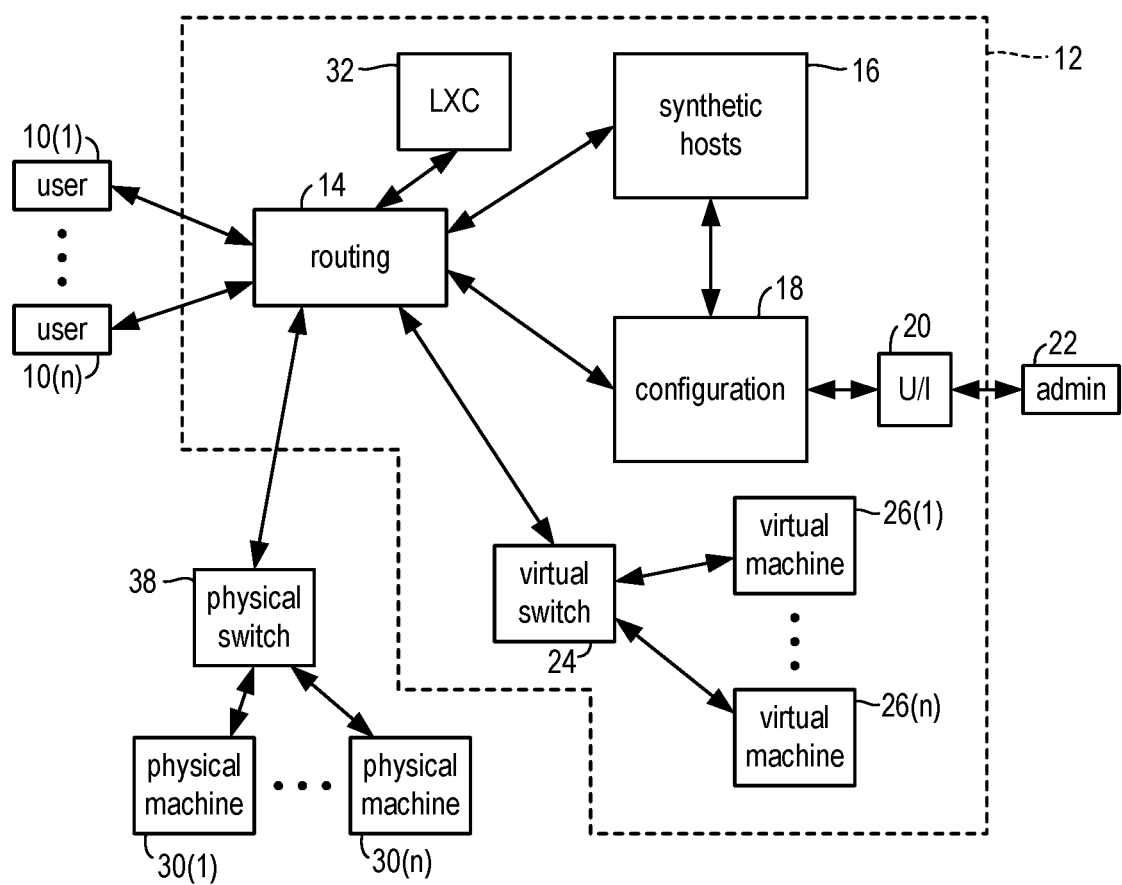
FIG. 1 is a block diagram showing an example of an environment for simulating a large network.

To facilitate understanding of various concepts discussed in more detail below, certain terms used throughout this description are first explained. For example, a host is a computer that is connected to the Internet or to some other network and that is identifiable using an IP (internet protocol) address or an address according to some other protocol. A host may be implemented in various ways. A physical host is an actual computer that is connected to a network and that is assigned an address on that network. A virtual host is software that appears to the network as a physical computer and that has an assigned network address specific to that virtual host, but that may have an indirect relationship to the actual physical computer(s) on which that software is executing. As one example, multiple virtual hosts may coexist on a single computer. That computer may have its own network address, each of the virtual hosts executing on that computer may have its own unique network address, and the computer may further execute software that acts as a virtual switch to direct traffic to and from the correct virtual host. As another example, one or more computers may execute virtual machine programs that emulate resources of a computer, that have network addresses, and that provide services through those network addresses. However, those services may actually be generated by software executing on machines elsewhere in the network and provided to the virtual machines over separate network connections.

A host can be a client and/or a server. A client is a computer that obtains services from other computers on a network. Examples include, without limitation, computers executing email software to send and receive emails and computers executing browser software to obtain web content. A server is a computer that provides services on the network. Examples include, without limitation, web servers, file servers, and name servers.

A simulation host is a host that is created for purposes of a large network simulation. A simulation host may appear to users of the simulation as an actual host in the simulated large network. Users of the simulation may interact with a simulation host. Although a simulation host may mimic a host on the Internet or other real-world network, a simulation host only exists in the simulation.

A primary simulation host (or "primary host") is created for use in a large network simulation and is preconfigured in advance to have desired characteristics and responses. A primary host may designed as part of a simulation to provide users with information they can and/or should use when carrying one or more training objectives of the simulation. Depending on the desired fidelity, a simulation host may be implemented in various ways. Simulation host fidelity is discussed below.

A background simulation host (or "background host") may be automatically generated and may have responses that are randomly (or pseudo-randomly) generated. Instantiation of a background host may be controlled by a volume parameter, as described below. Background hosts may be used to create "background noise" in a simulation. For example, background hosts may be used to simulate a large number of extraneous hosts. In the Internet or other real-world large network, such extraneous hosts would be present and would need to be discriminated from hosts of interest. Background hosts may be implemented using synthetic hosts, as discussed more fully below.

Fidelity of a simulation host refers to the degree to which that simulation host mimics a host of the same type that may be found in the real world.

A high fidelity simulation host may offer a wide range of services and content, may allow interaction with other hosts, may respond to a full range of network commands, may be continually updated with content from the real world (e.g., actual news feeds), may provide detailed search functions, may have updatable databases, may represent a "virtual machine" that presents a fully-functional operating system with which users may interact, etc. A high fidelity simulation host may execute for the entirety of a simulation. An example of a high fidelity simulation host is a host mimicking a real world web server and that provides a full range of services offered by a similar real-world web server.

A medium fidelity simulation host may have less functionality than a high fidelity host, but may also execute for the entirety of a simulation to maintain state information and permit a moderate level of user interaction. An example of a medium fidelity host is a host that operates an SQL (structured query language) database into which users may write records.

A low fidelity host may only respond to low level network commands (e.g., a Ping, an Echo, a DNS lookup). Low fidelity hosts may be instantiated as needed and may only remain instantiated for a short time period.

A host on a network is perceptible through its response to network traffic. If appropriate responses to network packets directed towards a host are generated and injected into a network on behalf of a queried host, it is possible to give the appearance that the queried host exists, even if that host does not correspond to an actual physical or virtual machine. A simulated network may be presented by implementing network services using direct network traffic generation and by combining hosts of varying fidelities onto a single network. Users of that single network may be allowed to interrogate (e.g., query, check the status of, request service from, and/or otherwise communicate with), and/or otherwise interact with, physical and virtual hosts where necessary, but low fidelity synthetic hosts may be used for a smaller range of interrogations and/or other interactions. This simulates a network that is much larger than the network actually being used and minimizes resources needed for the simulation.

Examples of methods and systems described herein simulate large networks that use IP as a higher layer network protocol and that may be linked to local networks that use Ethernet as a lower layer network protocol. Simulated networks may include simulations of the Internet or portions thereof. However, other examples of methods and systems according to the concepts described herein may simulate networks that use other protocols and/or that may not include the Internet.

Methods and systems according to concepts described herein may provide an easily configurable cyber simulation environment. Such methods and systems may combine simulation hosts of varying fidelities to represent large-scale networks, but may require minimal hardware. Various real or simulated open source data events (e.g., social media, news) and simulated network services can be included to create a scalable and tailorable environment for cyber training, tool development, case studies, and testing of defensive or offensive cyber measures.

In order to provide a realistic training environment, it is desirable to simulate a large-scale network that mimics networks found in the real world. A real network may include, and a realistic network simulation should mimic, millions to billions of hosts. Instead of relying solely on physical and virtual hosts to actually create such a network, which would be very expensive and time consuming, simulation hosts of different fidelities can be combined onto a single network using direct traffic manipulation. High and medium fidelity simulation hosts may be used to simulate hosts with which trainees and/or other simulation users may be expected to have detailed interaction. Low fidelity simulation hosts can be used to create volume and to portray the presence of a large number of hosts that cannot easily be discriminated from hosts of interest. Traffic may be manipulated by altering source and/or destination addresses, latency, and other aspects to make hosts appear to reside on different subnets, to reside in geographically remote regions, and/or to otherwise appear real.

Using conventional techniques to construct such a large number of hosts with varying sets of services would be extremely labor intensive. A procedural generation method can be used to automatically instantiate low-fidelity synthetic hosts on demand. Synthetic hosts are not actual hosts. Instead, synthetic hosts are may exist as simple data objects that consume few memory and processor resources and that provide limited services such as response to low level network commands. Synthetic hosts may ignore interrogations seeking higher level services or may return error messages in response to such interrogations. Synthetic hosts may be instantiated in response to interrogation by a simulation user and may remain instantiated until expiration of a time-out period. At the expiration of that period, the synthetic host may be de-instantiated and memory or other resources allocated to that synthetic host may be released.

Synthetic hosts can be used to implement a very large number of background hosts, and may do so without requiring input from an administrator for each individual background host. In particular, an administrator (e.g., a simulation designer or a trainer) may specify a volume parameter value that defines a number of synthetic hosts to be created. Within the limits of that volume parameter, software algorithms may automatically instantiate background hosts in response to interrogations from users of a simulation. The background hosts may have characteristics and responses that are automatically and pseudo-randomly generated. Incoming traffic may first be compared to instantiated background hosts, and in particular, to data objects that were instantiated in response to previous requests and that have not timed out. If no instantiated background host is found, the volume parameter value can be checked to see if a background host should be created. If a background host is allowed to exist per the volume parameter value, a data object for that background host may be instantiated and a response to an interrogation generated.

Billions of background hosts can be supported using conventional computing components. Prior to instantiation, those background hosts may exist solely as a host configuration document in a non-relational database. The host configuration document may describe the volume parameter, the algorithms to be used to instantiate background hosts, and other aspects to be included in instantiated background host data objects. Once instantiated, background host data object will respond to interrogations and will remain instantiated until time-out period expiration. In this manner, a background host will appear to exist on the simulated network as a real host, but will consume very little computational and memory resources.

Synthetic hosts may also be used to implement primary hosts. Like background hosts, a primary host implemented using a synthetic host ("synthetic primary host") may also be instantiated on the fly in response to interrogations and may only provide responses to simple interrogations. Unlike background hosts, however, synthetic primary hosts are not subject to the volume constraint, and simulation network addresses corresponding to those synthetic primary hosts are designated during the configuration of the simulation. Responses to synthetic primary hosts may also be pre-selected during configuration of the simulation.

A medium fidelity host may be implemented by a Linux container (LXC). An LXC is a method for isolating applications running on a single Linux kernel via separate namespaces. LXC hosts, or "container" hosts, may exist as configuration documents in a database, as well as an associated set of Linux containers. This takes advantage of the ability to share a network namespace across multiple running containers in order to effectively merge multiple running applications and make them appear to be running on the same host. This gives the ability to host standard Linux applications such as the Apache web server or MySQL database at a lower computational cost than hosting a virtual machine.

High fidelity hosts may be implemented with virtual or physical machines. These hosts may correspond to configuration documents describing their network mapping from an overlay network, described below, to the actual network on which they reside. This allows seamlessly merging existing physical or virtual infrastructure into a simulated network.

By constructing a simulated network with hosts of varying fidelity, it is possible to simulate a large network with limited resources. High and medium fidelity resources (virtual and physical hosts, LXC container hosts) can be reserved for mimicking targets with which trainees are expected to directly interact and/or to interact in detail. Low fidelity resources (background hosts, certain primary hosts) can be used to construct millions of other hosts so that targets of interest are not as conspicuous. This allows reducing cost while also enhancing realism.

Various aspects of an actual network that might be used to simulate the Internet or other large network may detract from realism of that simulation. For example, hosts on a local network will typically share characteristics such as latency, time-to-live (TTL), etc. To further increase simulation realism, network performance characteristics, packet header data fields, and/or other parameters may also be manipulated in a simulated network.

FIG. 1 is a block diagram showing an example of an environment for simulating a large network. The simulated large network may be created by software components executing on one or more computers, which software components may also be in communication with additional physical hosts. For convenience, the term "simulation computer system" is used herein to refer generically to one or more computers on which such software components are executed. FIG. 1 is not intended to represent a specific architecture of an actual network used to simulate a large network. Non-limiting examples of such architectures are provided below.

An arbitrary number of users 10(1) through 10(n) may be in communication with simulation computer system 12. That communication appears to users 10 as communication with a large network that is being simulated using computer system 12. Throughout the following description and in the drawings, similar elements are sometimes identified using a common numerical designator and different appended parentheticals (e.g., users 10(1) through 10(n)). Elements identified in such a manner may also be identified collectively (e.g., users 10) or generically (e.g., a user 10) using the numerical designator without a parenthetical. The lower case letter "n" in such parentheticals represents an arbitrary positive integer and indicates that an arbitrary number of like elements may be present. The value of "n" may or may not be the same for different groups of components. For example, the total number of users 10 in the example of FIG. 1 may be the same as, or different from, the total number of physical machines 30 and/or may be the same as, or different from, the total number of virtual machines 26.

Each of users 10 may, but need not necessarily, be an individual undergoing training with the simulated large network. Each of users 10 may be configured as a different host with a unique address in the simulated large network. In some implementations, each of users 10 may correspond to a separate user computer that is in communication with simulation computer system 12 over a local or wide area network.

An administrator 22 may also be in communication with simulation computer system 12. Administrator 22 may access simulation computer system 12 using a computer that is part of system 12, or using a computer linked to system 12 over a local or wide area network. Although a single administrator 22 is shown, there may be multiple administrators 22. Administrator 22 may be the designer(s) of the large scale network being simulated with simulation computer system 12. For example, administrator 22 may be one or more persons who provided input through one or more user interfaces 20 to a configuration component 18. That input may have specified details of the simulated network such as the volume of background hosts to be generated, designation of primary hosts, how primary hosts will respond, values for network performance parameters, data to configure virtual hosts corresponding to virtual machines 26, data to configure medium fidelity hosts corresponding to LXC 32, data mapping actual network addresses to overlay network addresses, data establishing simulated domain name server (DNS) responses, and/or other data. The input from administrator 22 and other configuration data for the Ser. No. 19/192,047 simulated network may be stored in a configuration database maintained in memory of computer system 12. Administrator 22 may also or alternatively be one or more persons that monitors a simulation while in progress, that provides real-time modification or other data input to the simulation, or that otherwise provides input to an in-progress simulation.

Figure 2:
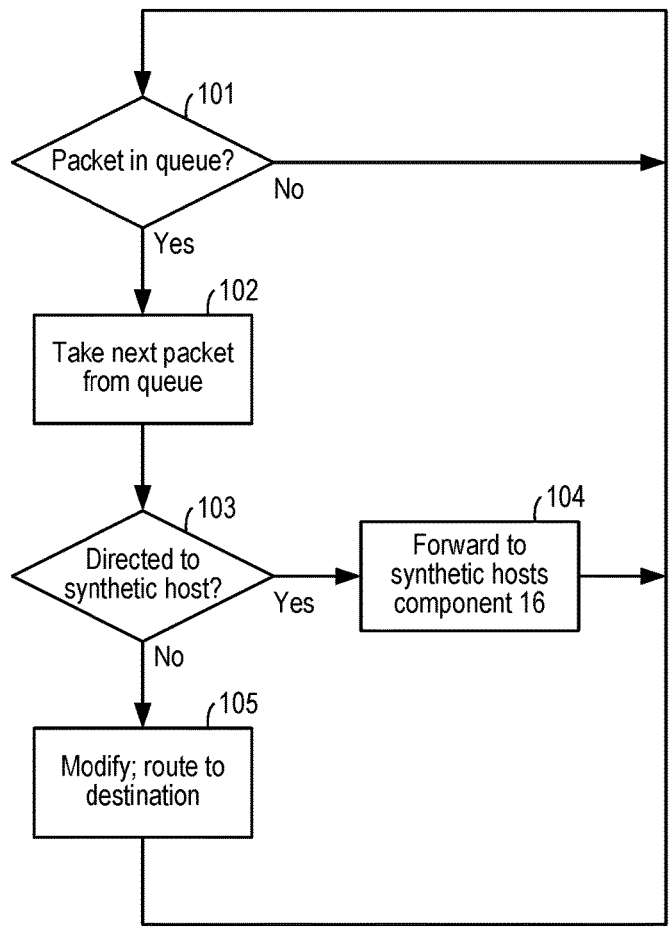
FIG. 2 is a flow chart showing operations that may be performed by a routing component.

Each of users 10 accesses the simulated large network through a routing component 14. Routing component 14 may be a software component that is configured to examine incoming traffic from users 10 and determine if that traffic should be forwarded to a physical, virtual, or container host, or to determine if that traffic is instead directed to a synthetic host. FIG. 2 is a flow chart showing operations that may be performed by routing component 14.

Routing component 14 may have a queue for packets received from users 10. In step 101, routing component 14 checks that queue to determine if there are any received packets that must be handled. If no, step 101 is repeated. If yes, routing component 14 proceeds to step 102 and takes the next packet from the queue. In step 103, routing component 14 examines the packet and determines if it is directed toward a synthetic host.

In some implementations, routing component 14 may perform this determination by examining the destination IP address in the packet. In the example of FIG. 1, virtual hosts implemented on virtual machines 26 (and accessed through virtual switch 24), physical hosts implemented on physical machines 30 (and accessed through physical switch 28), and container hosts implemented through LXCs 32 are being used in connection with simulating a large network. If the destination IP address in a packet does not correspond to a simulated host implemented with a physical host 30, a virtual host 26, or a container host, the packet is determined to be directed to a synthetic host.

If the packet is determined to be directed to a synthetic host, and as indicated by the "yes" branch from step 103, routing component 14 forwards the packet to synthetic hosts component 16 (hereinafter "component 16") for further processing (step 104). Operations of component 16 are discussed below. From step 104, routing component 14 returns to step 101.

If routing component 14 determines in step 103 that the packet has an address corresponding to a simulated host implemented with a physical host 30, a virtual host 26, or a container host, and as indicated by the "no" branch from step 103, routing component 14 proceeds to step 105. In step 105, routing component 14 may modify the source and/or destination address in the packet. So as to increase realism of the simulated network, actual IP addresses of physical, virtual, and container hosts are not visible to users 10. Instead, virtual, physical, and container hosts may be identifiable to users 10 based on IP addresses that more closely mimic IP addresses that would be used by real-world hosts being represented in the simulation. Actual IP addresses of users 10 may also be modified so as to increase simulation realism. Modifying source and destination addresses of physical hosts 30, virtual hosts 26, and container hosts, as well as of users 10, further allows merging of traffic to and from synthetic hosts with traffic to and from physical, virtual, and container hosts.

To merge traffic from synthetic hosts with traffic from other types of simulation hosts, router component 14 may modify IP addresses to create an "overlay network," i.e., a shadow layer 2 network overlaying an actual layer 2 network used by simulation computer system 12 and users 10. This may be accomplished by configuring router component 14 to rewrite Ethernet and IP headers according to a host configuration object as specified by administrator 22 and stored in the configuration database. Hosts on the actual network route all outbound traffic through router component 14. Router component 14 then modifies the traffic before it is sent to its final destination. This modification may involve rewriting source and destination MAC and IP addresses, as well as re-computing any checksums required to maintain packet validity. In this way, traffic can be directed to or from any IP address in the simulation to a particular physical, virtual, or container host while giving traffic the appearance of coming from an entirely different host. Router component 14 may also be configured to modify response packets to reflect random variations of hops in a simulated route of response packets.

Figure 3:
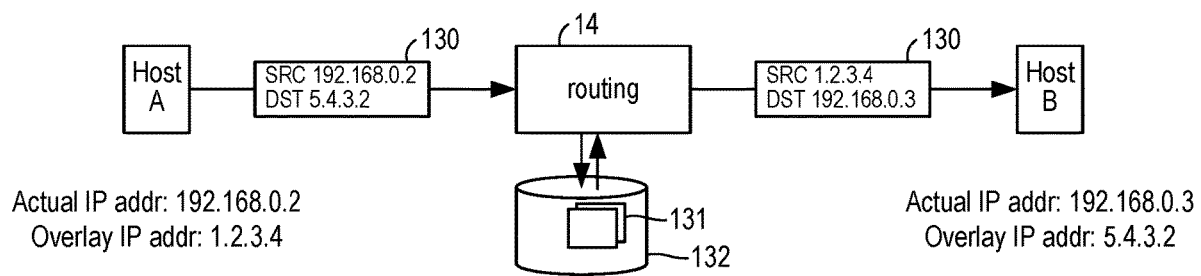
FIG. 3 shows an example of address modification that may be performed by a routing component.

FIG. 3 shows an example of this address modification. A first host A has an actual IP address, i.e., an IP address in an actual network in which the simulated large-scale network is being generated, of 192.168.0.2. Host A has an overlay IP address, i.e., an IP address in the simulated large-scale network, of 1.2.3.4. Host A may be any of a user 10, a physical host 30, a virtual host 26, or a container host. Host B, which may also be any of a user 10, a physical host 30, a virtual host 26, or a container host, has an actual IP address of 192.168.0.3 and an overlay IP address of 5.4.3.2. Host A transmits a packet 130 directed to host B using the host B overlay IP address 5.4.3.2, which is the address known to host A, as the host B actual IP address of 192.168.0.3 is not known to host A. Routing component 14 receives packet 130 and checks the source and destination IP addresses in packet 130. Routing component 14 compares those addresses to one or more look-up tables 131, in a simulation configuration database 132, that map actual IP addresses to overlay IP addresses, and vice versa. Using information from tables 131, routing component 14 rewrites the source address of packet 130 from the host A actual IP address (192.168.0.2) to the host A overlay IP address (1.2.3.4), rewrites the destination address of packet 130 from the overlay IP address of host B (5.4.3.2) to the actual IP address of host B (192.168.0.3), and forwards packet 130 to host B.

As explained in more detail below, synthetic hosts are not actual hosts. Instead, synthetic hosts correspond to data objects executing in simulation computer system 12. Those data objects generate responses to interrogating packets, and those responses include source addresses corresponding to destination addresses in the interrogating packets. Because a synthetic host is not actually a host, and may not have an actual network address to which an overlay network address must be mapped, it may not be necessary for routing component 14 to rewrite the destination addresses in the interrogating packets from users or source addresses in the responses generated by the synthetic host data objects. However, routing component 14 may rewrite source addresses in the interrogating packets from users and destination addresses in the responses generated by the synthetic host data objects.

To increase simulation realism, routing component 14 may also be configured to alter performance characteristics of communications in the simulated large-scale network. For example, routing component 14 may be configured to induce latency, packet loss, and/or bandwidth limits on any packets handled by routing component 14. Administrator 22 may configure routing component 14 when designing a simulated network and/or during the simulation. For any range or ranges of overlay network IP addresses selected by administrator 22, data in simulation configuration database 132 may configure routing component 14 to randomly drop a percentage of received packets (based on a percentage chosen by administrator 22), to randomly drop a percentage of transmitted packets (based on a percentage chosen by administrator 22), to induce receiving latency based on a time value (e.g., in milliseconds) chosen by administrator 22, to induce transmission latency based on a time value (e.g., in milliseconds) chosen by administrator 22, to limit reception bandwidth based on a value (e.g., in gigabits per second) chosen by administrator 22, to limit transmission bandwidth based on a value (e.g., in gigabits per second) chosen by administrator 22, and/or to adjust TTL values of packets based on values specified by administrator 22.

If administrator 22 configures particular simulated network segments to have congestion, damage, or other conditions that would result in packet loss, latency, and/or limited bandwidth, these effects can be applied automatically by routing component 14 upon determining that an appropriate source or destination overlay IP address for a packet corresponds to one of those simulated network segments. Bandwidth limitations may be simulated by tracking the volume of traffic across a link in the simulated network, and then delaying or dropping packets as necessary to stay within a configured bandwidth. Network latency and packet loss may be simulated by delaying and dropping packets, respectively.

Figure 4:
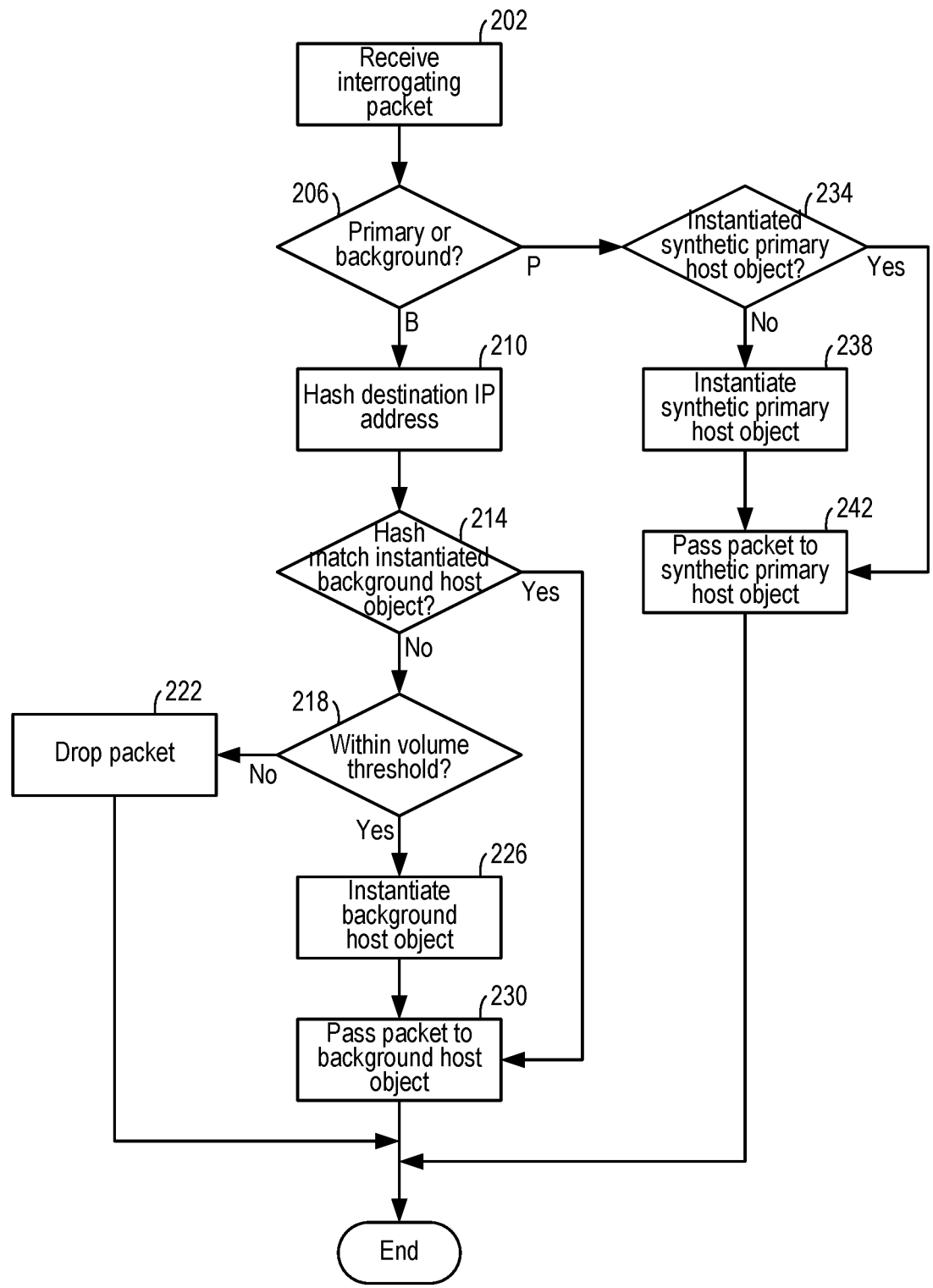
FIG. 4 is a flow chart showing operations that may be performed by a synthetic hosts component.

Returning to FIG. 2, if routing component 14 determines in step 103 that a packet is directed to a synthetic host, the packet is forwarded to component 16 for further processing. Component 16 may be a software component that is configured to instantiate data objects corresponding to synthetic hosts and generate responses from those instantiated objects that appear to come from an actual host. Component 16 and routing component 14 may be executing within the same computer. FIG. 4 is a flow chart showing operations that may be performed by component 16. In step 202, component 16 receives the packet from routing component 14. For convenience, that packet is referred to as the "current packet" in connection with discussion of FIG. 4. In step 206, component 16 determines if the current packet is directed to a primary host by comparing the destination IP address of the current packet to a list of synthetic primary hosts maintained in database 132. If the current packet is not directed to a primary host, component 16 determines that the current packet is directed to a potential background host. Based on a determination that the current packet is directed to a potential background host, and as indicated by the "B" branch from step 206, component 16 proceeds to step 210.

In step 210, component 16 performs a hash of the current packet destination IP address. For convenience, that hash is referred to below as the "current packet hash." Component 16 then proceeds to step 214 and compares the current packet hash to similar hashes associated with instantiated data objects for background hosts. As explained below, a data object for a synthetic host may remain instantiated until expiration of a time-out period. Each such data object may have a corresponding hash that was created by applying the same hashing function used in step 210 to a destination IP address in a received packet that caused the data object to be instantiated. If the current packet hash matches a hash for an instantiated background host data object, and as indicated by the "yes" branch, component 16 proceeds to step 230. Step 230 is discussed below. If the current packet hash does not match a hash for an instantiated background host data object, and as indicated by the "no" branch, component 16 proceeds to step 218.

Figure 5:
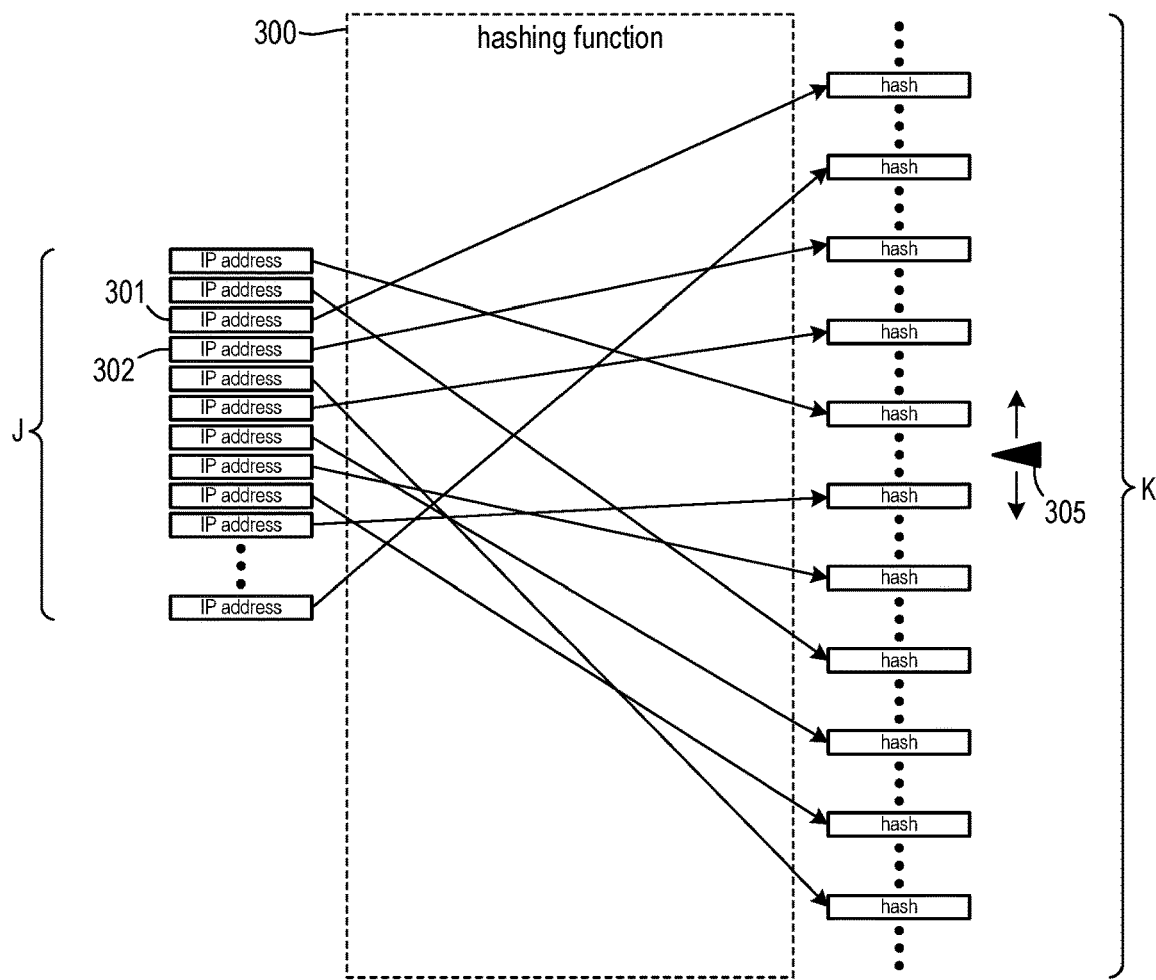
FIG. 5 is a diagram illustrating a volume constraint on synthetic host generation.

In step 218, component 16 determines if a volume parameter value for the simulation permits instantiation of a background host. FIG. 5 is a diagram that explains examples of operations that may be performed by component 16 as part of, or that are otherwise relevant to, step 218. Column J represents a list of all IP addresses that are not assigned to a primary host in the large network being simulated. The IP addresses in column J are arranged in ascending numerical order moving down in column J. However, there may be gaps between two adjacent IP addresses in column J. Such gaps may correspond to addresses assigned to primary hosts, or to addresses that are unlikely to be queried in the simulated network. For example, IP address 301 may be 185.013.199.200 and IP address 302 may be 185.013.200.000, with IP addresses in the range 185.013.199.201 through 185.013.199.255 assigned to one or more primary hosts. Column J may include billions of IP addresses. Addresses may range from 0.0.0.0 to 255.255.255.255 under IPv4, which allows for over four billion addresses.

Using the same hashing function that was used in step 210, which hash function is indicated in FIG. 5 with a broken line box 300, each of the IP addresses in column J deterministically maps to a different hash in column K. The order of the hashes in column K, when sorted numerically, is different from the order of the IP addresses in column J and will appear as a random re-arrangement. However, hashing function 300 will always return the same output for a given input. Accordingly, repeated hashings of an IP address with function 300 will always return a hash that has the same value, and thus the same relative location in column K. Numerous known hashing functions can be used, for a large range of inputs and for a desired hash length, to deterministically return a pseudo-random value for a specific input.

A volume parameter value is indicated in FIG. 5 by a pointer 305 positioned along column K. The value indicated by pointer 305 may represent, e.g., a percentage of the number of hashes in column K. If the current packet hash is within a threshold set by the pointer 305 value, then component 16 will consider the current packet destination IP address to correspond to a possible background host within a permitted volume range. Otherwise, component 16 will determine that destination IP address to correspond to a possible background host outside the permitted volume range.

As one example, value 305 may be set at 45%, with 45% of the hashes in column K above pointer 305 and 55% of the column K hash values below pointer 305. If the current packet hash is within the 45% of hashes above pointer 305, then the current packet destination IP address corresponds to a possible background host within the permitted volume range.

Providing a volume parameter as a limit on background host generation provides administrator 22 with a way to control the complexity of a large network simulation. The volume parameter also allows administrator 22 to limit the resources of simulation computer system 12 that may be used for background hosts.

Returning to FIG. 4, if component 16 determines in step 218 that the current packet destination IP address is outside the volume threshold, component 16 proceeds to step 222. In step 222, the current packet is dropped. If component 16 determines in step 218 that the current packet destination IP address is within the volume threshold, component 16 proceeds to step 226.

Figure 6:
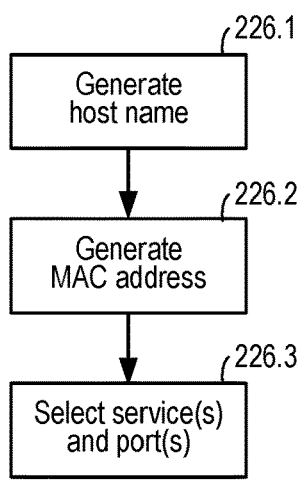
FIG. 6 is a flow chart showing operations that may be performed in connection with instantiating a background host data object.

In step 226, component 16 instantiates a data object that corresponds to a background host associated with the current packet IP address. Operations of step 226 are shown in FIG. 6. In step 226.1, component 16 generates a host name based on the current packet hash. Component 16 may generate that host name pseudo-randomly by using the current packet hash as a seed for a pseudo-random number generator that, for a given seed value, always returns the same output. This output is referred to below as "the resulting pseudo-random number." Algorithms that deterministically output a pseudo-random number of a desired length, in response to an input selected from a large input number range, are known.

A portion of the resulting pseudo-random number may then be used to select a top-level domain (e.g., .gov, .edu, .net, .mil, .com) for a background host. As one example of how this may be performed, the least significant digit of the resulting pseudo-random number could be used to select a top-level domain (e.g., .gov is selected if least significant digit is 0 or 1, .edu is selected if least significant digit is 2 or 3, etc.) Other portions of that pseudo-random number may then be mapped to letters, using a deterministic algorithm, so as to generate a random string of letters for a sub-domain name of the background host. As one example of how this may be performed, an algorithm may choose a first letter based on the two least significant digits of the resulting pseudo-random number (e.g., a for 00 through 03, b for 04 through 07, c for 08 through 11, etc.), choose a second letter based on the third and fourth least significant digits of the resulting pseudo-random number, choose a third letter based on the fifth and sixth least significant digits of the resulting pseudo-random number, etc., up to a desired length. A separate algorithm could be used to select the subdomain name length based on the resulting pseudo-random number, or all subdomain names could have the same length.

In step 226.2, component 16 generates a MAC address for the background host corresponding to the data object being instantiated. Component 16 may generate that MAC address based on the resulting pseudo-random number. Alternatively, a separate deterministic pseudo-random algorithm can be used to generate a 48-bit number from the current packet hash as a seed. That 48-bit number can then be converted to hexadecimal format to represent a MAC address.

In step 226.3, component 16 determines the services that will be provided by the background host corresponding to the data object being instantiated. As one example of how this may be performed, component 16 may have a list of services that can be provided by a background host. Examples of such services may include, without limitation, the following: Discard Protocol using TCP (transmission control protocol), Echo Protocol using TCP, DNS (domain name server), Modbus query using TCP, NTP (network time protocol) using UDP (user datagram protocol), Ping using ICMP (internet control message protocol), and Telnet using TCP. Component 16 may then use the resulting pseudo-random number from step 226.1 to select from that list. One example of how this may be performed is as follows. If the least significant digit in the resulting pseudo-random number is even, then the first service in the list (e.g., Discard) is available, but if that digit is odd, the first service is not supported. If the second least significant digit in the resulting pseudo-random number is even, then the second service in the list (e.g., Echo) is available, but if that digit is odd, the second service is not supported. Similar operations can be performed to determine if other possible services in the list are to be supported.

In step 226.3, component 16 also determines ports that will be used for services to be provided. These ports may also be selected based on the resulting pseudo-random number from step 226.1. One example of how this may be performed is by assigning a range of possible ports to each possible service. Each port could then be mapped to a range of possible values for one or more digits of the resulting pseudo-random number. A similar algorithm could be performed for other port assignments, with lists of possible ports for subsequent services being adjusted, as necessary, if a port from that list has already been assigned.

Figure 7:
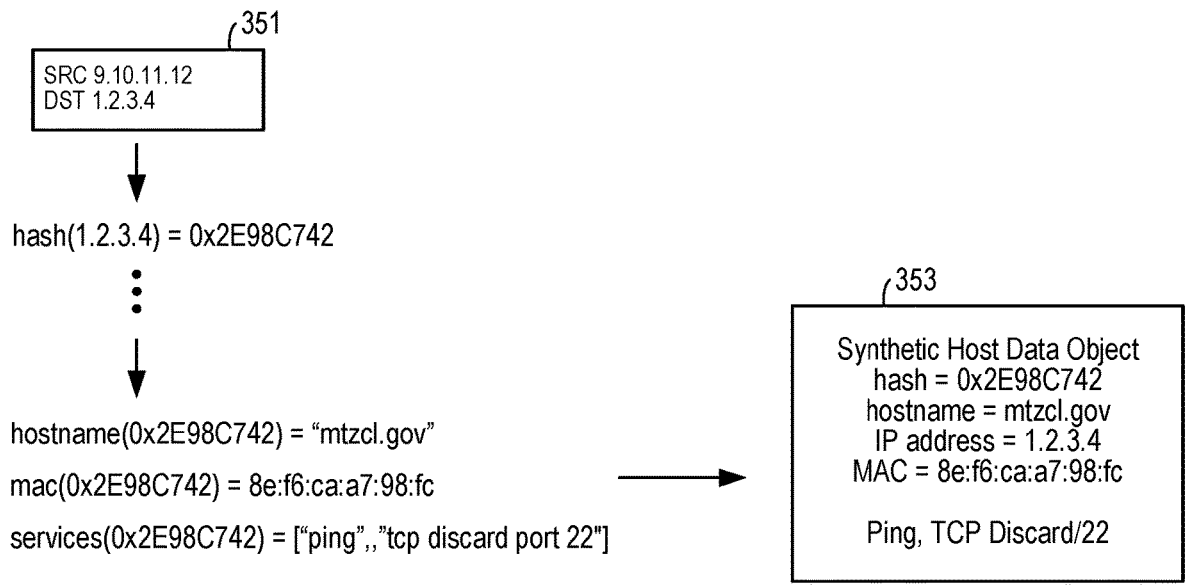
FIG. 7 shows an example of procedurally instantiating a background host data object.

FIG. 7 shows an example of the procedural generation of a background host data object performed in steps 226.1 through 226.3. A current packet 351 has a destination IP address of 1.2.3.4. The hashing function of 210 (also indicated as function 300 in FIG. 5) converts an IPv4 address to a pseudo-random 32-bit value. In the case of the packet 351 destination address, the hash is 0x2E98C742. That hash is provided as an input to a subroutine "hostname" that generates a host name "mtzcl.gov" using algorithms such as are described in connection with block 226.1. That hash is also provided as an input to a subroutine "mac" that generates a MAC address "8e:f6:ca:a7:98:fc" using algorithms such as are described in connection with block 226.2. That hash is further provided as an input to a subroutine "services" that generates a list of services and ports using algorithms such as are described in connection with block 226.3. The resulting background host data object 353 is then ready to respond to packet 351, as well as any other packets directed to IP address 1.2.3.4 and received before time-out of object 353.

Figure 8:
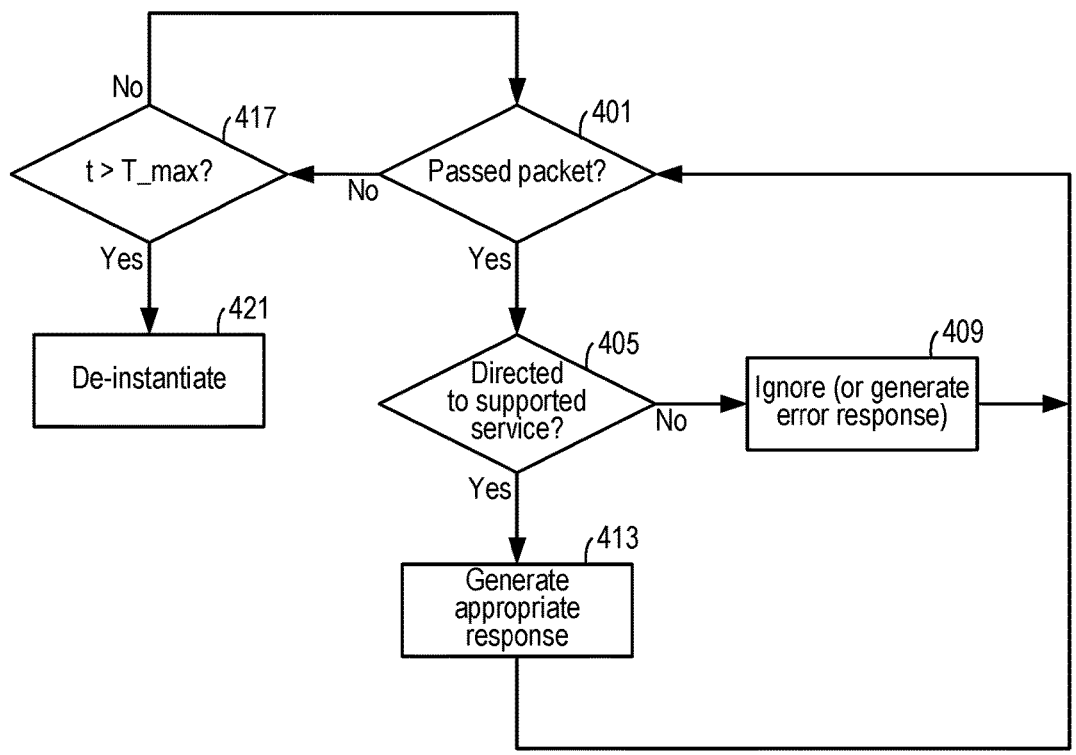
FIG. 8 is a flow chart showing operations performed by an instantiated synthetic host data object.

Returning to FIG. 4, component 16 continues to step 230 at the completion of step 226. In step 230, component 16 passes the current packet to the instantiated background host data object corresponding to the current packet hash. FIG. 8 shows operations performed by a background host data object. In step 401, the data object determines if a packet has been passed for handling. If so, and as shown by the yes branch, the data object proceeds to step 405 and determines if the packet is requesting a service that the data object supports. If the requested service is not supported, the data object proceeds to step 409 and ignores the request. Alternatively, a data object could be configured to generate an error response. An error response, if generated, may be passed to routing component 14 for forwarding to the user that caused the current packet to be sent. From step 409, the data object returns to step 401.

If the requested service is supported, the data object proceeds to step 413 and generates an appropriate response to the requested service. For example, if a background host data object is configured to support an ICMP Ping service, and the current packet is a ping, the data object generates an appropriate ICMP reply packet. This gives the appearance that a host actually exists, while consuming minimal resources. The generated response in step 413 is passed to routing component 14 for forwarding to the user that caused the current packet to be sent. The source IP address of the response (or of an error response generated in step 409) would be the same overlay IP address used as the destination address in the current packet. If appropriate, routing component 14 may apply performance degradation to the response (e.g., increasing latency, dropping) as discussed above. From step 413, the data object returns to step 401.

In step 401, the data object again determines if a packet has been passed for handling. If not, and as indicated by the "no" branch, the data object proceeds to step 417. In step 417, the data object determines if a value of a timer t is greater than a time-out value T_max. The value of timer t may be the amount of time that has elapsed since any of a "yes" determination in step 401, a completion of step 413, or a completion of step 409. An example of a time-out value T_max is 10 seconds.

If the value of timer t is not greater than T_max, and as indicated by the "yes" branch, the data object returns to step 401. If the value of timer t is greater than T_max, and as indicated by the "no" branch, the data object proceeds to step 421. In step 421, the data object is de-instantiated. Memory, processor, and other resources allocated to the data object are released.

The use of a time-out value as described above permits a background host data object respond to certain service requests that may require maintenance of short-term state information. In general, synthetic host services that respond to traffic may be effectively stateless and provided based on static host configuration objects. Many network services are inherently stateless, such as a standard ICMP Echo Request/ Reply or ping. A single ping service can respond for any synthetic host that supports a ping service as long as the outgoing ICMP Echo Reply has the appropriate source and destination IP addresses. Some services are not stateless, however. A TCP service will require some state to maintain the connection and sequence numbers. Such states are transient, however, and can be disposed of when a connection is torn down. Maintaining instantiation of a synthetic host for a short time may allow, for example, the synthetic host to temporarily maintain state information that may be needed for responses to subsequent interrogations (e.g., to maintain a count of sequence numbers needed to respond to TCP service interrogations).

Returning to FIG. 4, and as indicated by the "P" branch from step 206, component 16 proceeds to step 234 in response to determining that the current packet is directed to a synthetic primary host. In step 234, component 234 determines if there is an instantiated synthetic primary host data object associated with the destination IP address in the current packet. If so, and as shown by the "yes" branch, component 16 proceeds to step 242. Step 242 is described below. If component 16 determines in step 234 that there is not an instantiated synthetic primary host data object associated with the destination IP address in the current packet, and as indicated by the "no" branch, component 16 proceeds to step 238.

In step 238, component 16 instantiates a data object for the primary host based on data stored in configuration database 132 (FIG. 3). That data may be stored based on input provided by administrator 22 during configuration of a network simulation. That data may specify a MAC address and a host name for the synthetic primary host corresponding to a particular IP address, as well as services to be provided by the synthetic primary host. The services provided may include, without limitation, those described above as potential services that may be supported by background hosts.

Component 16 proceeds from step 238 to step 242. In step 242, component 16 passes the current packet to a synthetic primary host data object that corresponds to the IP address of the current packet. In step 242, the current packet is handled in a manner similar to that described in connection with FIG. 8.

After completion of step 222, step 230, or step 242, the process of FIG. 4 ends. The process of FIG. 4 may be separately repeated for each packet forwarded to component 16 from routing component 16.

Returning to FIG. 1, configuration component 18 may be a software component that is configured to receive input from administrator 22 via one or more user interfaces 20, and to generate data for simulation hosts, simulated network performance parameters, and other configuration data used to simulate a large-scale network. In addition to providing input for generation of synthetic primary host objects, administrator 22 may provide input that configures one or more medium-fidelity hosts that will be generated using LXCs and/or one or more high-fidelity hosts that will be created using a physical machine 30 or a virtual machine 26.

When designing a simulated network, an initial input from administrator 22 may be information that describes the network to be simulated and primary hosts on that network. The primary hosts can be synthetic hosts, or may be virtual, physical, or container hosts. Information provided by administrator 22 may further be used to control DNS responses to users 10 seeking to access websites in the simulated network. By controlling all DNS responses, it is possible to make simulated web sites appear at well-known addresses. It is then a straightforward process to implement simulated news, social media, and other types of sites, which can be configured as primary hosts. These tools can be used to teach techniques that may otherwise be difficult to train. For example, simulated propaganda news sites combined with simulated social media posts containing misinformation can reinforce lessons regarding taking OSINT information at face value.

Administrator 22 may determine what the training tasks are to be included in a training scenario. Administrator 22 may select from scripted but editable lists of scenario characteristics (provided by user interfaces 20) such as geographic locations, language(s), and networks. Administrator 22 may then append data to address specific learning objectives by the users 10 and save a uniquely named scenario for later recall. Each user 10 may be assigned a device with a specific IP address and be provided with a simulated communication architecture (email, SMS, PTT, calls) to allow natural communication flow of higher/lower/ adjacent activities of live participants in the simulation. The simulation architecture may be self-contained or closed loop for cyber security reasons. However, there may be hooks to control data flow to and from external sources (e.g., internet of things or stimulated real world systems) that may be desired in certain circumstances. The simulation may be combined with host services that provide a robust simulated internet whereby on-line persona accounts, for live and simulated participants within a designated network architecture, are provided. In some scenarios, a live participant may not have independent dynamic ability to establish new accounts or delete accounts for themselves. In such scenarios, establishing new accounts or deleting existing accounts may be accomplished through an adjudication request back to administrator 22, who can execute such tasks dynamically if desired. All simulated traffic may be scalable. Administrator 22 may control the flow and intensity of the traffic thereby increasing or decreasing the complexity of the task by fluctuating the amount of data that users 10 must process. Users 10 may be provided real world automated software tools to assist users in performing simulated cyber security tasks, detecting relevant information, and/or performing simulated cyber combat missions. All data residing and moving through the simulation may be collected for dynamic and post execution analysis. For example, all packets processed by routing component 14 can be captured and stored.

When developing a training scenario, a common timeline displaying events and content across all of the implemented OSINT simulations may allow administrator 22 to construct training scenarios involving complex behaviors and related events, while illustrating different facets of those events across different sources. This enables more effective training of the collection, processing, exploitation, and dissemination (PED) by intelligence analysts, removing the need to "white card" their activities during training events. A "white card," also known as a Mission Event Synchronization List (MESL) inject (single event), is a technique used to pass information to participants in a simulation regarding events that are not being simulated, and that allows participants to indicate how they would respond to such events. White carding, which is frequently used in connection with events that may be unsafe or impractical to actually simulate, may lessen training effectiveness.

During simulation of a network, it may be useful to simulate loss or degradation of a portion of a network (e.g., because of physical damage due to war or other events). Routing all traffic via software makes this possible. As discussed above, controls allow customizable network performance degradation (packet loss rates, send/receive latency, and bandwidth) to be configured on a host or network segment basis. To further increase the realism, these parameters may be configured on an asymmetric basis. This enables configuring different max transmit/receive rates and/or different transmit/receive latencies. These parameters can be tweaked by administrator 22 real-time during training to simulate operating on networks with different uplinks or being affected by enemy EW (electronic warfare) techniques.

A network simulation can also be integrated with other types of training activities. For example, one or more of users 10 could be personnel designed to maintain or repair a network or a portion thereof. Such users may provide input in the form of, e.g., simulated repairs or upgrades to the simulated network. The effects of those modifications can then be simulated.

As another example, a simulation of a large-scale network could be integrated with other types of existing LVC (live, virtual, and constructive) simulations through DIS (distributed interactive simulation) or HLA (high-level architecture), thereby permitting integration of cyber and intelligence forces. This integration allows two-way interoperability where events and effects from a simulated network can influence events in the maneuver simulation and vice versa. Enhanced realism can be attained, removing the need for "white carding" cyber and intelligence injects. By configuring hosts with location information, kinetic effects such as munitions destroying a building can cause an effect on the simulated network by bringing those hosts down. By virtue of routing all traffic in software, primary hosts that were destroyed in the virtual world can be "taken down" by simply not routing their traffic in the overlay network. To users 10, it will appear as if the munition either physically destroyed the host or caused damage to supporting infrastructure. Similarly, events from the simulated network can influence the maneuver simulation and its trainees. The location of simulation actors in an existing LVC simulation can be used to geotag relevant open source media leading to cross-queuing maneuver units to areas of interest discovered via intelligence gathering. This can also reinforce OPSEC (OPerational SECurity) lessons as soldiers witness intelligence analysts turn seemingly harmless information into actionable intelligence.

Numerous actual network architectures can be used to implement large-scale network simulations such as are described herein. In some examples, simulation computer system 12 may be a single computer, or may be multiple computers in communication over a local or wide area network. In some embodiments, simulation computer system 12 may itself be implemented as one or more virtual hosts executing on one or more servers, with users 10 accessing those servers over an Internet (or other wide area network) connection. In all of these cases, however, simulation computer system 12 includes one or more processors and memory, with the memory storing instructions that, when executed by the one or more processors, cause the processors to carry out the operations of simulation computer system 12 described herein.

Figure 9:
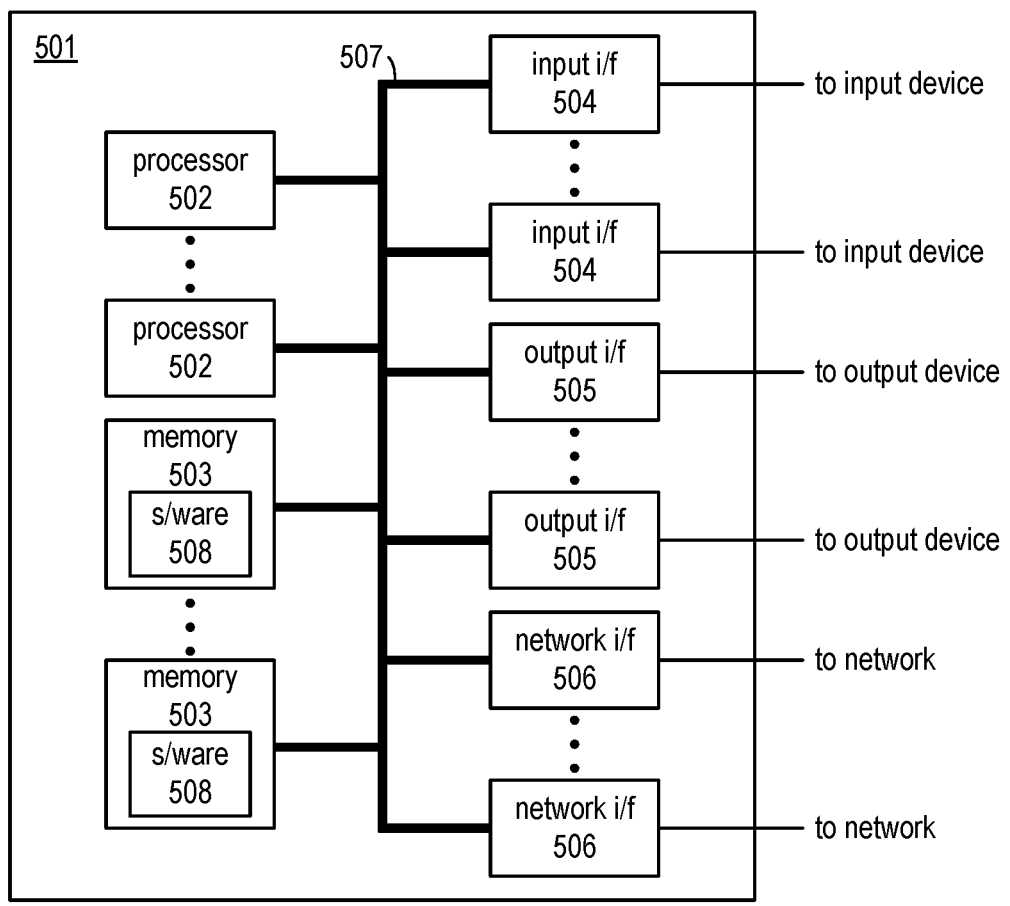
FIG. 9 is a block diagram of an example computer.

FIG. 9 is a block diagram of an example computer 501, one or more of which may be used to implement simulation computer system 12 and to perform operations such as those described herein. Computer 501 may comprise one or more processors 502, one or more memories 503, one or more input interface controllers 504, one or more output interface controllers 505, and one or more network interfaces 506, all of which may communicate over one or more busses 507. Processor(s) 502 may include any of various types of computational devices such as, without limitation, programmable microprocessors. Processor(s) 502 may execute instructions that cause computer 501 to perform one or more operations such as are described herein. Memory(ies) 503 may include any of various types of non-transitory machine-readable storage media such as, without limitation, random access memory (RAM), read-only memory (ROM), FLASH memory, magnetic tape or discs, optical discs, etc. Memory(ies) 503 may be volatile or non-volatile. Input interface controller(s) 504 may include hardware and/or software that allow user input devices (e.g., a keyboard, a mouse, a touch screen) to communicate data to processor(s) 502. Output interface controller(s) 505 may include hardware and/or software that allow user output devices (e.g., display screens, printers) to output user-understandable information based on data from processor(s) 502. Network interface(s) 506 may include hardware and/or software that allow processor(s) 502 to communicate with processors of other computers via one or more types of wired or wireless networks. Examples of network interfaces include, without limitation, Ethernet adaptors and Wi-Fi adaptors (e.g., operating in accordance with one or more IEEE 802.11 WLAN standards).

Memory(ies) 503 may store software 508 that provides instructions to processor(s) 502 that, when executed by processor(s) 502, cause computer 501 to perform some or all operations such as are described herein. Software 508 may comprise machine-executable instructions and other data (e.g., configuration information for a simulated network), and may include both application software and operating system software. Executable instructions that cause computer 501 to perform operations such as are described herein may also or alternatively be stored in other forms, e.g., as firmware or as hardware logic in an integrated circuit.

For the avoidance of doubt, the present application includes the subject-matter described in the following numbered paragraphs ("para."):

1. A method comprising receiving, by a computer system, interrogations directed to host addresses in a simulated network; determining, by the computer system, that the host addresses correspond to possible background hosts; instantiating, by the computer system and in response to at least a portion of the interrogations, data objects corresponding to the possible background hosts; generating, by the instantiated data objects, responses to the interrogations; and forwarding, by the computer system to users from which the interrogations were received, the responses to the interrogations.

2. The method of para. 1, further comprising: receiving, by the computer system, second interrogations directed to second host addresses in the simulated network; determining, by the computer system, that the second host addresses correspond to second possible background hosts; determining, by the computer system, that the second possible background hosts are outside a permitted background host volume threshold; and determining, by the computer system and based on the determination that the second possible background hosts are outside the permitted background host volume threshold, that data objects corresponding to the second possible background hosts should not be instantiated.

3. The method of para. 1 or para. 2, wherein instantiating the data objects corresponding to the possible background hosts comprises, for each of the possible background hosts, pseudo-randomly generating a host name.

4. The method of any of para. 1 through para. 3, wherein instantiating the data objects corresponding to the possible background hosts comprises, for each of the possible background hosts, pseudo-randomly selecting one or more services supported by the possible background host.

5. The method of any of para. 1 through para. 4, wherein instantiating the data objects corresponding to the possible background hosts comprises, for each of the possible background hosts, pseudo-randomly selecting one or more ports supported by the possible background host.

6. The method of any of para. 1 through para. 5, further comprising: storing, in one or more memories of the computer system, configuration data corresponding to primary hosts in the simulated network; receiving, by the computer system, interrogations directed to third host addresses in the simulated network; determining, by the computer system, that the third host addresses correspond to primary hosts; and forwarding, by the computer system and to the primary hosts, the interrogations directed to the third host addresses.

7. The method of para. 6, further comprising rewriting, by the computer system and based on the configuration data, source and destination addresses of the interrogations directed to the third host addresses.

8. The method of para 6 or para. 7, further comprising rewriting, by the computer system and based on the configuration data, source and destination addresses of responses to the interrogations directed to the third host addresses.

9. The method of any of para. 1 through para. 8, further comprising inducing, by the computer system, simulated performance degradation of the simulated network.

10. The method of para. 9, wherein the simulated performance degradation comprises one or more of simulated received packet loss, simulated transmitted packet loss, simulated reception latency, simulated transmission latency, simulated reception bandwidth reduction, simulated transmission bandwidth reduction, or loss of connectivity to portions of the simulated network.

11. A method comprising receiving, by a computer system, first interrogations directed to first host addresses in a simulated network; determining that the first host addresses correspond to first possible background hosts; and instantiating, in response to the first interrogations, data objects corresponding to the first possible background hosts.

12. The method of para. 11, further comprising: generating, by the instantiated data objects, responses to the first interrogations.

13. The method of para. 12, further comprising: forwarding, to users from which the first interrogations were received, the responses to the first interrogations.

14. The method of any of para. 11 through para. 13, further comprising: receiving second interrogations directed to second host addresses in the simulated network; determining that the second host addresses correspond to second possible background hosts; determining that the second possible background hosts are outside a permitted background host volume threshold; and determining, based on the determination that the second possible background hosts are outside the permitted background host volume threshold, that data objects corresponding to the second possible background hosts should not be instantiated.

15. The method of any of para. 11 through para. 14, wherein the determining that the second possible background hosts are outside the permitted background host volume threshold comprises: generating, for each of the second host addresses, a hash of the second host address; comparing the generated hashes to a sorted listing of hashes corresponding to a listing of host addresses comprising the first host addresses and the second host addresses; and determining that each of the generated hashes is outside of a predetermined range defined in the sorted listing of hashes.

16. The method of any of para. 11 through para. 15, wherein instantiating the data objects corresponding to the first possible background hosts comprises, for each of the first possible background hosts, pseudo-randomly generating a host name.

17. The method of any of para. 11 through para. 16, wherein instantiating the data objects corresponding to the first possible background hosts comprises, for each of the first possible background hosts, pseudo-randomly selecting one or more services supported by the first possible background host.

18. The method of any of para. 11 through para. 17, wherein instantiating the data objects corresponding to the first possible background hosts comprises, for each of the first possible background hosts, pseudo-randomly selecting one or more ports supported by the first possible background host.

19. The method of any of para. 11 through para. 18, further comprising: storing, in one or more memories of the computer system, configuration data corresponding to primary hosts in the simulated network; receiving third interrogations directed to third host addresses in the simulated network; determining that the third host addresses correspond to primary hosts; and forwarding, to the primary hosts, the third interrogations.

20. The method of para. 19, further comprising rewriting, based on the configuration data, source and destination addresses of the third interrogations.

21. The method of para. 19, further comprising rewriting, based on the configuration data, source and destination addresses of responses to the third interrogations.

22. The method of any of para. 11 through para. 21, further comprising inducing simulated performance degradation of the simulated network.
23. The method of para. 22, wherein the simulated performance degradation comprises one or more of simulated received packet loss, simulated transmitted packet loss, simulated reception latency, simulated transmission latency, simulated reception bandwidth reduction, simulated transmission bandwidth reduction, or loss of connectivity to portions of the simulated network.
24. A method comprising: receiving, by a computer system, interrogations directed to host addresses in a simulated network; generating, for each of the host addresses, a hash of the host address; comparing the generated hashes to a sorted listing of hashes corresponding to a listing of possible host addresses; determining that each of the generated hashes is outside of a predetermined range defined in the sorted listing of hashes; determining, based on each of the generated hashes being outside of the predetermined range, that data objects should not be instantiated for hosts corresponding to the host addresses.
25. The method of para. 24, further comprising: receiving second interrogations directed to second host addresses in the simulated network; generating, for each of the second host addresses, a hash of the second host address; comparing the generated hashes of the second host addresses to the sorted listing of hashes corresponding to the listing of possible host addresses; determining that each of the generated hashes of the second host addresses is inside of the predetermined range; and instantiating, based on each of the generated hashes of the second host addresses being inside of the predetermined range, data objects corresponding to simulated hosts associated with the second host addresses.
26. The method of para. 25, further comprising: generating, by the instantiated data objects, responses to the second interrogations.
27. The method of para. 26, further comprising: forwarding, to users from which the second interrogations were received, the responses to the second interrogations.
28. The method of any of para. 25 through para. 27, wherein instantiating the data objects comprises, for each of the simulated hosts, pseudo-randomly generating a host name.
29. The method of any of para. 25 through para. 28, wherein instantiating the data objects comprises, for each of the simulated hosts, pseudo-randomly selecting one or more services supported by the simulated host.
30. The method any of para. 25 through para. 28, wherein instantiating the data objects comprises, for each of the simulated hosts, pseudo-randomly selecting one or more ports supported by the simulated host.
31. The method of any of para. 24 through para. 30, further comprising inducing simulated performance degradation of the simulated network.
32. The method of claim 31, wherein the simulated performance degradation comprises one or more of simulated received packet loss, simulated transmitted packet loss, simulated reception latency, simulated transmission latency, simulated reception bandwidth reduction, simulated transmission bandwidth reduction, or loss of connectivity to portions of the simulated network.
33. The method of any of para. 24 through para. 32, further comprising: storing, in one or more memories of the computer system, configuration data corresponding to primary hosts in the simulated network; receiving third interrogations directed to third host addresses in the simulated network; determining that the third host addresses correspond to primary hosts; and forwarding, to the primary hosts, the third interrogations.
34. The method of para. 33, further comprising: rewriting, based on the configuration data, source and destination addresses of the third interrogations.
35. The method of any of para. 33 through para. 34, further comprising rewriting, based on the configuration data, source and destination addresses of responses to the third interrogations.
36. One or more non-transitory machine-readable media storing instructions that, when executed, cause one or more computers to perform the steps of any of paras. 1 through 35.
37. One or more computers, each of the one or more computers comprising one or more processors and memory, wherein the memory of the one or more computers stores instructions that, when executed, cause the one or more computers to perform the steps of any of paras. 1 through 35.

The foregoing has been presented for purposes of example. The foregoing is not intended to be exhaustive or to limit features to the precise form disclosed. The examples discussed herein were chosen and described in order to explain principles and the nature of various examples and their practical application to enable one skilled in the art to use these and other implementations with various modifications as are suited to the particular use contemplated. The scope of the invention encompasses, but is not limited to, any and all combinations, subcombinations, and permutations of structure, operations, and/or other features described herein and in the accompanying drawing figures.

The invention claimed is:
1. A method comprising:
receiving, by a computer system, a first interrogation directed to a first host address in a simulated network;
instantiating, in response to the first interrogation and based on the first host address, a first background host data object, wherein the instantiating the first background host data object comprises pseudo-randomly generating a first host name comprising a first top-level domain name and a first sub-domain name;
forwarding, to a user from which the first interrogation was received, a response, to the first interrogation, generated by the first background host data object;
receiving, after the instantiating of the first background host data object, a second interrogation directed to a second host address in the simulated network;
determining the second host address does not correspond to a host in the simulated network;
instantiating, based on the determining and based on the second host address, a second background host data object, wherein the instantiating the second background host data object comprises pseudo-randomly generating a second host name comprising a second top-level domain name and a second sub-domain name; and
forwarding, to a user from which the second interrogation was received, a response, to the second interrogation, generated by the second background host data object.
2. The method of claim 1, further comprising:
receiving additional interrogations directed to additional host addresses in the simulated network;
determining that the additional host addresses correspond to possible background hosts;

determining that the possible background hosts are outside a permitted background host volume threshold; and determining, based on the possible background hosts being outside the permitted background host volume threshold, that background host data objects corresponding to the additional host addresses should not be instantiated.

3. The method of claim 2, wherein the determining that the possible background hosts are outside the permitted background host volume threshold comprises:

generating, for each of the additional host addresses, and using a hash function, a hash value of the additional host address, wherein the hash function maps each host address, in a set of host addresses comprising the first host address, the second host address, and the additional host addresses, to a pseudo-random hash value unique to the mapped host address;

comparing the generated hash values, of the additional host addresses, to a sorted listing of the hash values mapped to the host addresses of the set of host addresses; and determining that each of the generated hash values is outside of a predetermined range defined in the sorted listing.

4. The method of claim 1, wherein the instantiating the first background host data object comprises pseudo-randomly selecting one or more services supported by the first background host data object, and wherein the instantiating the second background host data object comprises pseudo-randomly selecting one or more services supported by the second background host data object.

5. The method of claim 4, wherein, for each of the first background host data object and the second background host data object, the one or more services comprise one or more of:

discard protocol using transmission control protocol (TCP),
echo protocol using TCP,
domain name server,
network time protocol using user datagram protocol,
ping using Internet control message protocol, or
Telnet using TCP.

6. The method of claim 1, wherein the instantiating the first background host data object comprises pseudo-randomly selecting one or more ports supported by the first background host data object, and wherein the instantiating the second background host data object comprises pseudo-randomly selecting one or more ports supported by the second background host data object.

7. The method of claim 1, further comprising:

storing, in one or more memories of the computer system, configuration data corresponding to primary hosts in the simulated network;

receiving additional interrogations directed to additional host addresses in the simulated network;

determining that the additional host addresses correspond to primary hosts; and forwarding, to the primary hosts corresponding to the additional host addresses, the additional interrogations.

8. The method of claim 7, further comprising rewriting, based on the configuration data, source and destination addresses of the additional interrogations.

9. The method of claim 7, further comprising rewriting, based on the configuration data, source and destination addresses of responses to the additional interrogations.

10. The method of claim 1, further comprising inducing simulated performance degradation of the simulated network.

11. The method of claim 10, wherein the simulated performance degradation comprises one or more of simulated received packet loss, simulated transmitted packet loss, simulated reception latency, simulated transmission latency, simulated reception bandwidth reduction, simulated transmission bandwidth reduction, or loss of connectivity to portions of the simulated network.

12. The method of claim 1, wherein the pseudo-randomly generating the first host name further comprises:

outputting, by a pseudo-random number generator, a first pseudo-random number; and determining, based on the first pseudo-random number, the first top-level domain name and the first sub-domain name; and wherein the pseudo-randomly generating the second host name further comprises:

outputting, by the pseudo-random number generator, a second pseudo-random number; and determining, based on the second pseudo-random number, the second top-level domain name and the second sub-domain name.

13. The method of claim 1, wherein the determining the second host address does not correspond to a host in the simulated network comprises determining the second host address does not correspond to a background host data object in the simulated network.

14. A method comprising:

receiving a volume parameter value corresponding to a quantity of instantiatable background hosts;

receiving, by a computer system, a first interrogation directed to a first host address in a simulated network;

generating, using a hash function, a first hash value for the first host address, wherein the hash function maps each host address, in a set of host addresses comprising the first host address and a second host address, to a pseudo-random hash value, unique to the mapped host address, of a set of pseudo-random hash values;

based on the first hash value being in a first subset of the set of pseudo-random hash values, and based on determining the first hash value does not correspond to a background host data object in the simulated network, instantiating a first background host data object based on the first host address, wherein the first subset is defined based on the volume parameter value;

forwarding, to a user from which the first interrogation was received, a response, generated by the first background host data object, to the first interrogation;

receiving, after the forwarding, a second interrogation directed to a second host address in the simulated network;

generating, using the hash function, a second hash value for the second host address; and determining, based on the second hash value being in a second subset of the set of pseudo-random hash values, that a background host data object should not be instantiated based on the second host address, wherein the second subset is defined based on the volume parameter value.

15. The method of claim 14, wherein instantiating the first background host data object comprises pseudo-randomly generating a host name comprising, for a background host represented by the first background host data object, a top-level domain name and a sub-domain name.

16. The method of claim 14, wherein instantiating the first background host data object comprises pseudo-randomly selecting one or more services supported by a background host represented by the first background host data object.

17. The method of claim 14, wherein instantiating the first background host data object comprises pseudo-randomly selecting one or more ports supported by a background host represented by the first background host data object.

18. The method of claim 14, further comprising inducing simulated performance degradation of the simulated network.

19. The method of claim 18, wherein the simulated performance degradation comprises one or more of simulated received packet loss, simulated transmitted packet loss, simulated reception latency, simulated transmission latency, simulated reception bandwidth reduction, simulated transmission bandwidth reduction, or loss of connectivity to portions of the simulated network.

20. The method of claim 14, further comprising:
storing, in one or more memories of the computer system, configuration data corresponding to primary hosts in the simulated network;
receiving additional interrogations directed to additional host addresses in the simulated network;
determining that the additional host addresses correspond to primary hosts; and
forwarding, to the primary hosts corresponding to the additional host addresses, the additional interrogations.

21. The method of claim 20, further comprising:
rewriting, based on the configuration data, source and destination addresses of the additional interrogations; and
rewriting, based on the configuration data, source and destination addresses of responses to the additional interrogations.

22. A method comprising:
receiving, by a computer system, a first interrogation directed to a first host address in a simulated network;
instantiating, in response to the first interrogation and based on the first host address, a first background host data object, wherein the instantiating the first background host data object comprises pseudo-randomly selecting one or more services supported by the first background host data object;
forwarding, to a user from which the first interrogation was received, a response, to the first interrogation, generated by the first background host data object;
receiving, after the instantiating of the first background host data object, a second interrogation directed to a second host address in the simulated network;
determining the second host address does not correspond to a host in the simulated network;
instantiating, based on the determining and based on the second host address, a second background host data object, wherein the instantiating the second background host data object comprises pseudo-randomly selecting one or more services supported by the second background host data object; and
forwarding, to a user from which the second interrogation was received, a response, to the second interrogation, generated by the second background host data object.

23. The method of claim 22, further comprising:
generating, based on additional host addresses in the simulated network, and using a hash function, a hash value for each of the additional host addresses, wherein the hash function maps each host address, in a set of host addresses comprising the first host address, the second host address, and the additional host addresses, to a pseudo-random hash value unique to the mapped host address;
determining that each of the generated hash values is outside of a predetermined range defined in a sorted listing of the hash values mapped to the host addresses of the set of host addresses; and
determining, based on each of the generated hash values being outside of the predetermined range, that background host data objects corresponding to the additional host addresses should not be instantiated.

24. The method of claim 22, wherein the instantiating the first background host data object comprises pseudo-randomly selecting one or more ports supported by the first background host data object, and wherein the instantiating the second background host data object comprises pseudo-randomly selecting one or more ports supported by the second background host data object.

25. The method of claim 24, wherein the instantiating the first background host data object comprises pseudo-randomly generating, based on the first host address, a first host name comprising a first top-level domain name and a first sub-domain name, and wherein the instantiating the second background host data object comprises pseudo-randomly generating, based on the second host address, a second host name comprising a second top-level domain name and a second sub-domain name.

26. The method of claim 22, wherein, for each of the first background host data object and the second background host data object, the one or more services comprise one or more of:
discard protocol using transmission control protocol (TCP),
echo protocol using TCP,
domain name server,
network time protocol using user datagram protocol,
ping using Internet control message protocol, or
Telnet using TCP.

27. The method of claim 22, further comprising inducing simulated performance degradation of the simulated network, wherein the simulated performance degradation comprises one or more of simulated received packet loss, simulated transmitted packet loss, simulated reception latency, simulated transmission latency, simulated reception bandwidth reduction, simulated transmission bandwidth reduction, or loss of connectivity to portions of the simulated network.

28. The method of claim 22, further comprising:
receiving additional interrogations directed to additional host addresses in the simulated network, wherein each of the additional interrogations comprises an additional interrogation source address and an additional interrogation destination address;
based on configuration data stored in one or more memories of the computer system, modifying, by rewriting the additional interrogation source addresses and the additional interrogation destination addresses, the additional interrogations;
forwarding, to hosts associated with the additional host addresses, the modified additional interrogations; and
based on the configuration data, modifying responses to the additional interrogations, wherein the each of the responses comprises a response source address and a response destination address, and wherein the modifying the responses comprises rewriting the response source addresses and the response destination addresses.

\* \* \* \* \*